(12) United States Patent
Hosokawa et al.

(10) Patent No.: US 6,797,087 B2
(45) Date of Patent: Sep. 28, 2004

(54) COMPOSITE MOLDED ARTICLE, STEERING WHEEL AND PRODUCTION METHOD THEREFOR

(75) Inventors: Makoto Hosokawa, Hamamatsu (JP); Seiya Nishimura, Hamamatsu (JP); Toru Makino, Inasa-gun (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 10/236,908

(22) Filed: Sep. 9, 2002

(65) Prior Publication Data

US 2004/0045396 A1 Mar. 11, 2004

(51) Int. Cl.$^7$ ................................................ B32B 31/16
(52) U.S. Cl. .................. 156/73.1; 156/73.5; 156/272.2; 74/558
(58) Field of Search .............................. 156/73.1, 73.5, 156/272.2, 293, 308.2, 379.6, 379.8, 580, 580.1, 580.2, 294; 74/552, 558; 264/45.5, 46.4, 46.7, 46.9

(56) References Cited

U.S. PATENT DOCUMENTS

| | | | | |
|---|---|---|---|---|
| 4,640,150 A | * | 2/1987 | Kobayashi et al. ............ | 74/552 |
| 5,205,887 A | * | 4/1993 | Yabuya et al. ............. | 156/73.5 |
| 5,421,925 A | * | 6/1995 | Kulaszewicz et al. ..... | 156/73.5 |
| 5,792,302 A | | 8/1998 | Nakada et al. | |
| 6,065,366 A | * | 5/2000 | Koyama et al. ............... | 74/552 |
| 6,280,674 B1 | * | 8/2001 | Kreuzer ...................... | 264/259 |
| 6,524,515 B1 | * | 2/2003 | Cavalli ........................ | 264/449 |

FOREIGN PATENT DOCUMENTS

| | | |
|---|---|---|
| JP | 6-170882 | 6/1994 |
| JP | 11-34881 | 2/1999 |
| JP | 11-91588 | 4/1999 |
| JP | 2000-38139 | 2/2000 |

* cited by examiner

*Primary Examiner*—James Sells
(74) *Attorney, Agent, or Firm*—Dickstein, Shapiro, Morin & Oshinsky, LLP.

(57) ABSTRACT

One object of the present invention is to provide a production method of a steering wheel in which divided bodies are securely integrated into a single unit without using adhesive. In order to achieve the object, the present invention provides a production method of a steering wheel comprising the steps of: a) providing a plurality of divided bodies 6, each of which comprises a surface material 3 and a plastic layer 4 provided on the inside of said surface material 3; b) forming an outer shell 2 by integrally welding said plastic layers 4 of said divided bodies 6; c) providing a core metal 1 to be arranged in said outer shell 2; and d) filling plastic between said outer shell 2 and said core metal 1.

6 Claims, 6 Drawing Sheets

COMPOSITE MOLDED ARTICLE, STEERING WHEEL AND PRODUCTION METHOD THEREFOR

BACKGROUND OF THE INVENTION

1. Field of the Invention

The present invention relates to a production method of a composite molded article such as a steering wheel having a plastic layer on the inside of a surface layer, and a composite molded article obtained by the method.

2. Description of the Related Art

Figure 9:
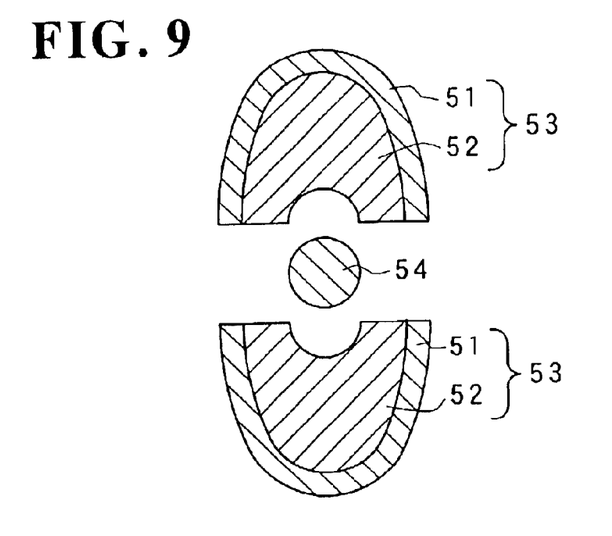
FIG. 9 is a cross-sectional view for explaining the production method of a steering wheel of the prior art.

A method like that shown in FIG. 9 has been proposed as a production method of a wood grain steering wheel in which the surface layer is composed of a wood material, and which has a plastic core material inside. In this method, the divided bodies 53 and 53 having a roughly U-shaped cross-section formed by dividing portions of the steering wheel other than a core metal 54 into two parts are butt joined followed by adhering corresponding divided bodies 53 and 53 as well as the divided bodies 53 and 53, and the divided body 53 and the core metal 54. The divided body 53 is composed of a surface material 51 comprised of a wood material, and a plastic core material 52 formed on the inside of the surface material 51.

However, this method had the disadvantages described below as a result of integrating the divided bodies 53 and 53 using adhesive.

Figure 10:
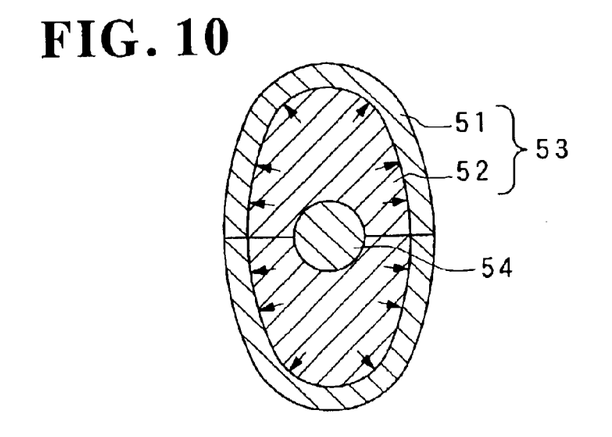
FIG. 10 is a cross-sectional view for explaining a problem in the prior art.
Figure 11:
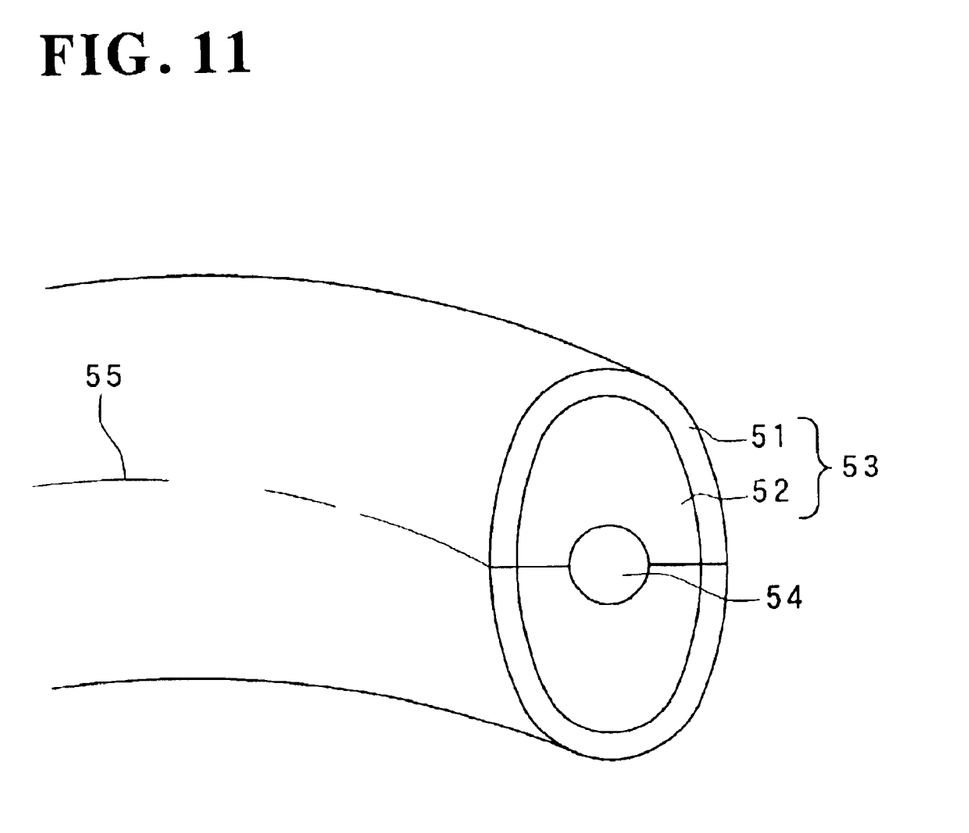
FIG. 11 is a perspective view for explaining a problem in the prior art.

Namely, in the steering wheel that was produced, there was the problem of susceptibility to the occurrence of cracking along the adhered surfaces of corresponding divided bodies 53 and 53. For example, when the plastic core material 52 expands due to changes in the environmental temperature, stress is concentrated in the joined surfaces of the divided bodies 53 as shown in FIG. 10, and when this stress on the joined surfaces increases, crack 55 forms along the joined surfaces in the coating film on the surface of the steering wheel as shown in FIG. 11.

In addition, since the joined surfaces of corresponding divided bodies 53 and 53 require a certain degree of high adhesive strength, and an annealing step is required following adhesion in order to satisfy this level of adhesive strength, the number of adhesion steps increases and the time required for adhesion becomes longer. In addition, an adhesion jig is also required.

Moreover, since adhesive is used, a step is required for removing burrs of adhesive that have protruded onto the steering wheel surface after the adhesion steps.

SUMMARY OF THE INVENTION

The present invention provides a method for integrating divided bodies in this manner, such as a method in which divided bodies can be integrated without using adhesive during the production of a composite molded article such as a steering wheel having a plastic layer on the inside of a surface material, as well as a composite molded article obtained with this method.

In order to solve the above problems, the present invention provides a composite molded article comprising a plastic layer integrally welded on the inside of a surface material which is divided into a plurality of divided bodies.

In addition, the present invention provides a production method of a composite molded article comprising the steps of: providing a plurality of divided bodies, each of which comprises a surface material and a plastic layer provided on the inside of the surface material; and integrally welding the plastic layers of a plurality of divided bodies.

In the production method of a composite molded article, it is preferable for the plastic layers of the divided bodies to be integrally welded by vibration welding, ultrasonic welding or high-frequency welding.

In the composite molded article obtainable by the present invention, the divided bodies can be integrated into a single unit without the use of adhesive. Thus, since adequate joining strength can be obtained in the welding step alone, in addition to an annealing step required in the case of using an adhesive no longer being required, since a step for removing adhesive burrs is also unnecessary, the number of steps is reduced and the amount of time required for production is shortened. In addition, the resulting composite molded article has superior strength.

The composite molded article and its production method of the present invention can be preferably applied to a steering wheel. Namely, the present invention provides a steering wheel comprising: a core metal; a central core provided around the periphery of at least a portion of the core metal, and an outer shell provided around the periphery of the central core; wherein the outer shell comprises a plurality of divided bodies comprising a surface material and a plastic layer provided on the inside of the surface material, and the plastic layers of the plurality of the divided bodies are mutually integrally welded.

In addition, the present invention provides a production method of a steering wheel comprising the steps of: a) providing a plurality of divided bodies, each of which comprises a surface material and a plastic layer provided on the inside of said surface material; b) forming an outer shell by integrally welding said plastic layers of said divided bodies; c) providing a core metal to be arranged in said outer shell; and d) filling plastic between said outer shell and said core metal.

In the production method of a steering wheel, it is preferable the plastic layers of the divided bodies to be integrally welded by vibration welding, ultrasonic welding or high-frequency welding.

The steering wheel obtained according to the present invention has superior strength since the outer shell is formed by combining a plurality of divided bodies having the surface material and the plastic layer provided on the inside of the surface material, and mutually integrally welding the plastic layers of the plurality of divided bodies.

DETAILED DESCRIPTION OF THE INVENTION

Figure 1:
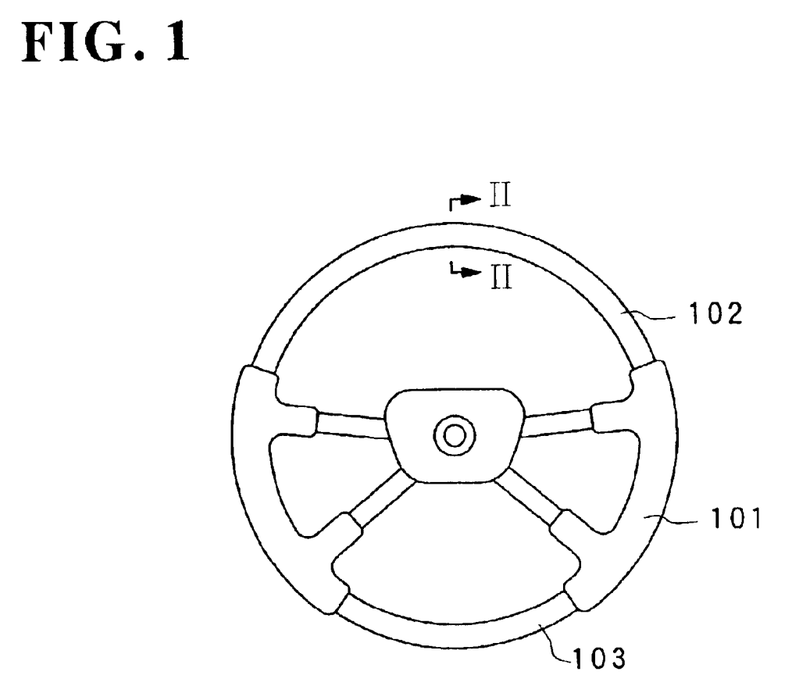
FIG. 1 is a plane view showing a first embodiment of the steering wheel according to the present invention.
Figure 2:
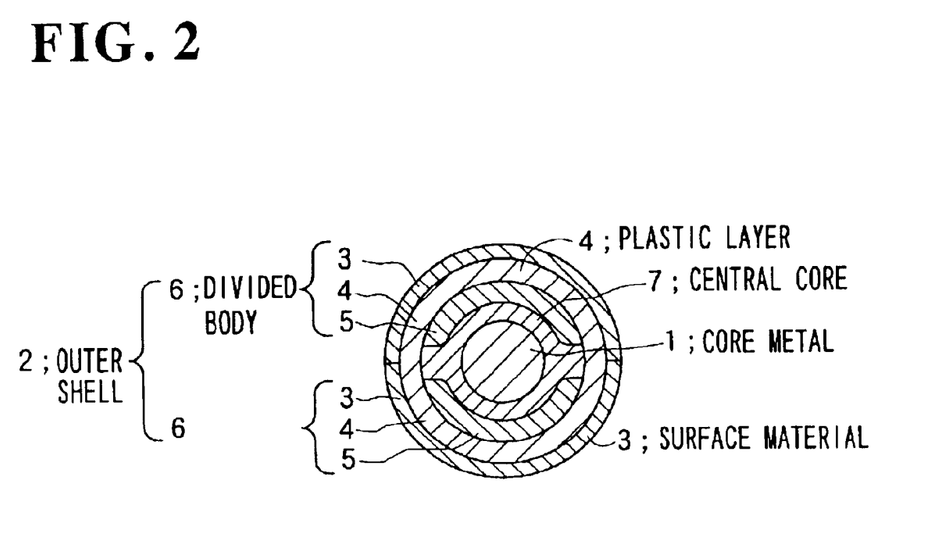
FIG. 2 is a cross-sectional view taken along line II—II in FIG. 1.

The following provides a detailed explanation of the present invention. FIGS. 1 through 5 show a first embodiment of the present invention. FIG. 1 is a plane view of a steering wheel, FIG. 2 is a cross-sectional view taken along line II—II in FIG. 1, and FIGS. 3 through 5 are explanatory drawings of the production process. In the figures, reference symbol 1 indicates a core metal, 2 indicates an outer shell, and 7 indicates a central core.

As shown in FIG. 1, the steering wheel of the present embodiment, when viewed from the top side (or bottom side), comprises leather covered portions 101 in the vicinity of the grips on the left and right sides of the rim, and the upper portion 102 and the lower portion 103 between the left and right leather covered portions 101 have a cross-sectional structure as shown in FIG. 2. Namely, the upper portion 102 and the lower portion 103 of the steering wheel of the present embodiment have a structure in which the plastic central core 7 is provided around the periphery of the core metal 1, and outer shell 2 in which a plastic layer 4 and a reinforcing ring 5 are sequentially laminated on the inner surface of the surface material 3, is provided around the periphery of the central core 7.

The core metal 1 is formed by welding a rim comprised of a iron or other metal rod, and spokes comprised of metal rods or metal plates. The spokes may be hereinafter omitted in the drawings.

The rim of the core metal 1 may have the shape of a pipe or various other cross-sectional shapes. In addition, the core metal 1 may be formed by die-cast molding a light metal such as aluminum or magnesium, and in this case, the rim and spokes are molded collectively.

The outer shell 2 is composed by combining two divided bodies 6 and 6.

The shape of divided body 6 should be that which allows the forming of the outer shell 2 of the steering wheel by combining a plurality of the divided bodies 6 and 6, and in the present embodiment, the outer shell 2 of the steering wheel is formed into a roughly semicircular cross-sectional shape divided into two divided parts on the top and bottom at a plane that passes through the center of the core metal 1.

Each of the divided body 6 is composed by integrally laminating the plastic layer 4 and the reinforcing rib 5 in order on the inner surface of the surface material 3. In the steering wheel of the finished product, the plastic layers 4 of two divided bodies 6 are mutually integrally welded, and the corresponding end surfaces of surface material 3 are mutually opposed with a slight gap in between.

Although there are no particular restrictions on the material of the surface material 3, examples of materials used include wood grain decorative panel, leather and synthetic resin film. Although the thickness of the surface material 3 differs according to the material used, in the case of a decorative panel, for example, that having a thickness of 0.45–0.85 mm is used.

Examples of the material used for plastic layer 4 include polycarbonate, ABS plastic and PPS (polyphenylsulfide), with PPS being particularly preferable. If the thickness of the plastic layer 4 is too thin, joining of the divided bodies 6 and 6 in the welding step described later is inadequate. On the other hand, if plastic layer 4 is too thick, the clearance between the core metal 1 and the outer shell 2 becomes small, and since this causes the injected amount of the material of the intermediate core 7 to be insufficient, the thickness of the plastic layer 4 is, for example, about 2.8–3.2 mm.

In addition, in the present embodiment, the reinforcing rib 5 is provided on the inside of the plastic layer 4. There are no particular restrictions on the shape, size or formed location and so forth of the reinforcing rib 5 provided it is able to prevent deformation of the divided body 6 in the vibration welding step to be described later. The reinforcing rib 5 may be provided at an interval in the lengthwise direction of the divided body 6, or may be formed continuously along the lengthwise direction of the divided body 6. The reinforcing rib 5 is preferably formed from the same material as the plastic layer 4 and formed integrally with the plastic layer 4.

The central core 7 is composed of a synthetic resin material, and is formed to as to fill in the space between the core metal 1 and the outer shell 2. Examples of the material of the central core 7 include urethane foam plastic, epoxy plastic, ABS plastic and PPS plastic, with urethane foam plastic being particularly preferable.

In addition, the leather covered portions 101 of the steering wheel of the present embodiment are provided by forming the leather covering base material on the outer periphery of the core metal 1 followed by covering it with leather. Although there are no particular restrictions on the material used to form the leather covering base material, preferable examples include urethane foam plastic, elastomer and epoxy foam plastic.

Figure 3A:
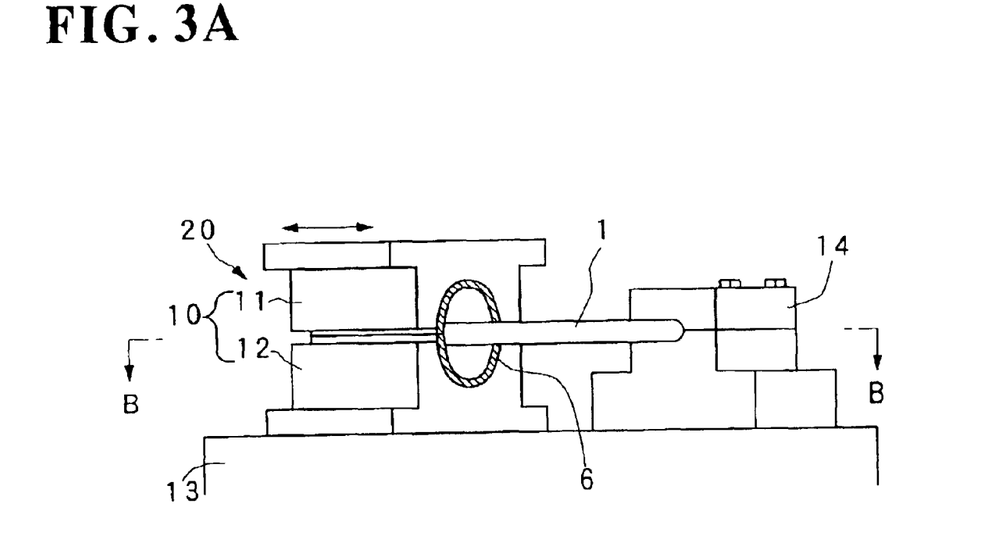
FIG. 3A is a perspective view and FIG. 3B is a plane view showing a first embodiment of the production method of a steering wheel according to the present invention.
Figure 3B:
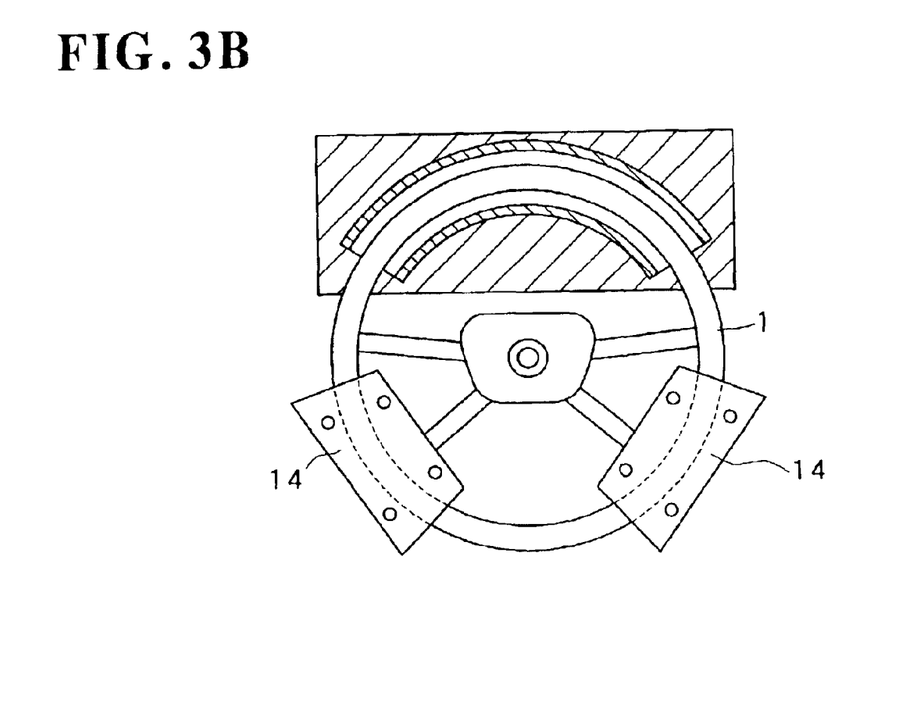
Figure 4:
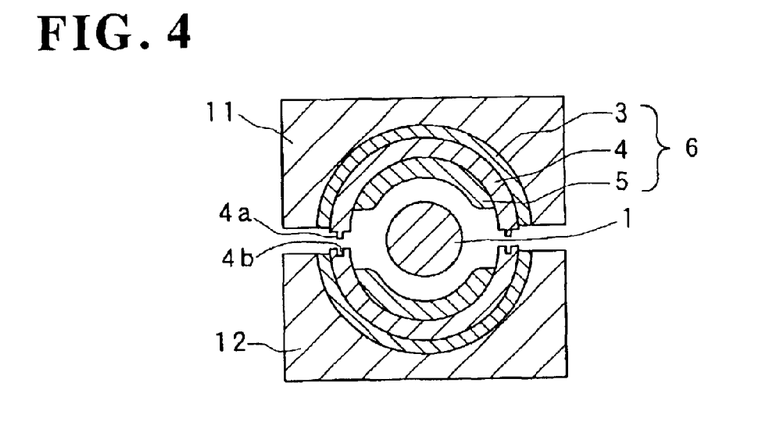
FIG. 4 is an explanatory drawing of the production process in a first embodiment of the production method of a steering wheel according to the present invention.

The following provides an explanation of the production method of the steering wheel of the present embodiment with reference to FIGS. 3 through 5. FIG. 3 shows an example of a vibration welding apparatus preferably used in the method of the present embodiment. FIG. 3A is a perspective view of the essential portions, and FIG. 3B is a plane view showing a portion of the cross-section. FIG. 3 shows the step of forming the outer shell 2 of upper portion 102 between the leather covered portions 101 on the left and right sides of the steering wheel. FIG. 4 is a cross-sectional view for explaining the step of placing the divided bodies 6 in the vibration welding apparatus of FIG. 3. FIG. 5 is an explanatory drawing of the step in which plastic is filled into the outer shell 2.

The divided body 6 is first produced in producing the steering wheel of the present embodiment. More specifically, after pre-molding surface material 3 with a method suitable for the material, such as thermo-compression pressing or vacuum pressing, the pre-molded surface material 3 is positioned in a mold, and then plastic is preferably integrally formed with the plastic layer 4 and the reinforcing rib 5 on the inside of the mold by, for example, injection molding, foaming, transfer molding or compression molding.

At this time, an engaging portion (to also be referred to as the joined end surface) of a shape that mutually engages with the plastic layer 4 of the other divided boy 6 that is joined on the end surface of the plastic layer 4 is provided on the end surface where the divided bodies 6 and 6 are mutually butt joined. In the present embodiment, a projection 4a is formed along the lengthwise direction of the divided body 6 in the end surface of the plastic layer 4 of one divided boy 6, while a groove 4b that engages with the above projection 4a is formed in the end surface of the plastic layer 4 of the other divided body 6. In addition, the engaging portions (projection 4a and groove 4b) of the divided bodies 6 and 6 are formed so that the end surface of the plastic layer 4 protrudes more than the end surface of the surface material 3 so that a gap is formed that is slightly larger than the gap between the surface materials 3 and 3 in the steering wheel desired to be obtained without any mutual contact between the joined end surfaces of surface materials 3 and 3 when the engaging portions of the divided bodies 6 and 6 are engaged and temporarily joined.

Next, the outer shell 2 is formed by integrally welding the plastic layers 4 and 4 of the divided body 6 serving as the top of the steering wheel and the divided body 6 serving as the bottom of the steering wheel using vibration welding apparatus 20 shown in FIG. 3.

A welding jig 10 of the vibration welding apparatus 20 of FIG. 3 is provided with a cavity capably of being vertically divided that holds divided bodies 6 and 6 inside. The upper part 11 of the welding jig 10 is fixed to a vibration means (not shown), while the lower part 12 of welding jig 10 is fixed to anchoring base 13.

The vibration means of the vibration welding apparatus 20 is provided with electromagnets arranged on both sides (linear type) or in three directions (orbital type), and by mutually synchronizing these electromagnets, is composed so as to apply vibrations to the upper part 11 of the welding jig 10 in the direction perpendicular to the direction of the diameter of the steering wheel (indicated with arrows in the drawing) in the center of the upper part 11. In addition, the anchoring base 13 is able to be inched up and down, and is composed so as to be able to apply a prescribed welding pressure in a direction that presses the lower part 12 against the upper part 11.

As shown in FIG. 4, cavities having an inner surface of the same shape as the shape of the outer surface of the divided body 6 are provided in the upper part 11 and the lower part 12 of the welding jig 10, and the welding jig 10 is composed so that the engaging portions (projection 4a and groove 4b) of the plastic layers 4 of the divided bodies 6 and 6 engage resulting in temporarily joining of the divided bodies 6 and 6 in a state in which the divided bodies 6 and 6 are contained within the cavities, and the upper part 11 and the lower part 12 are fixed to the vibration welding apparatus 20.

In addition, a core metal clamping jig 14 that removably clamps the core metal 1 is provided on the anchoring base 13. This core metal clamping jig 14 is composed so that, when the core metal 1 is clamped in this core metal clamping jig 14, the core metal 1 is clamped in a suspended state between the upper part 11 and the lower part 12 in a state in which these parts are fixed in the vibration welding apparatus 20.

As shown in FIG. 4, in order to integrate the top divided body 6 and the bottom divided body 6 of the steering wheel using this vibration welding apparatus 20, after placing the divided body 6 to serve as the top of the steering wheel and the divided body 6 to serve as the bottom of the steering wheel in the upper part 11 and the lower part 12, respectively, of welding jig 10, the upper part 11 and the lower part 12 are fixed in the vibration welding apparatus 20 followed by temporarily joining the divided bodies 6 and 6. At this time, the core metal 1, on which the leather covering base material (not shown) has been formed in advance, is fixed in the core metal clamping jig 14 followed by holding the core metal 1 between divided bodies 6 and 6.

Next, the anchoring base 13 is raised to apply pressure in the direction in which the lower part 12 is pressed against the upper part 11 while applying vibrations to the upper part 11 in the above vibrating direction (indicated with arrows in the drawing) by the vibration means of the vibration welding apparatus 20.

As a result, friction occurs on the joined end surfaces of divided bodies 6 and 6 that are temporarily joined, and are integrally welded in the vicinity of engaging portions 4a and 4b of the plastic layers 4 due to this frictional heat.

Integral welding of divided bodies 6 and 6 is respectively performed for the portion to serve as the upper portion 102 as well as the portion to serve as the lower portion 103 of the steering wheel.

In this vibration welding method, the quantity of frictional heat per unit time is represented by: $Q1=2af\mu p$ ($2a$: amplitude, f: frequency, $\mu$: coefficient of friction, p: welding pressure), while the quantity of heat per unit surface area Q2 is represented by: $Q2=Q1\ t/S=2af\mu pt/S$ (t: friction time, S: contact surface area).

The welding conditions given in the present embodiment preferably consist of vibration frequency of 100–240 Hz, amplitude of 0.5–5 mm, pressure of 0.5–5 MPa and oscillation time of about 1–20 seconds, and welding conditions are set within these ranges so as to obtain a suitable welded state. Here, a suitable welded state in the present embodiment refers to the state in which the plastic layers 4 and 4 are mutually integrally welded on the joined end surfaces of divided bodies 6 and 6, and corresponding surface materials 3 and 3 are mutually opposed with a slight gap between the end surfaces of surface materials 3 and 3 without making mutual contact.

In the present embodiment, since the joined end surfaces of divided bodies 6 and 6 are in a state in which the end surface of plastic layer 4 protrudes more than the end surface of surface material 3, a gap is formed between the corresponding end surfaces of surface materials 3 and 3 in the state in which divided bodies 6 and 6 are temporarily joined. During vibration welding, since pressure is applied in the direction in which the divided bodies 6 and 6 are pushed together, the melted or softened the plastic layers 4 are deformed by the welding pressure, which causes the gap between surface materials 3 and 3 to gradually decrease. Thus, vibration welding should be stopped prior to the corresponding end surfaces of surface materials 3 and 3 making contact by adjusting welding conditions.

Furthermore, since the reinforcing rib 5 is provided in the divided body 6, the occurrence of deformation in the divided body 6 due to the frictional force of corresponding divided bodies 6 when vibrations are applied is prevented, and welding pressure can be efficiently applied to the engaging portions 4a and 4b of the plastic layer 4.

Figure 5A:
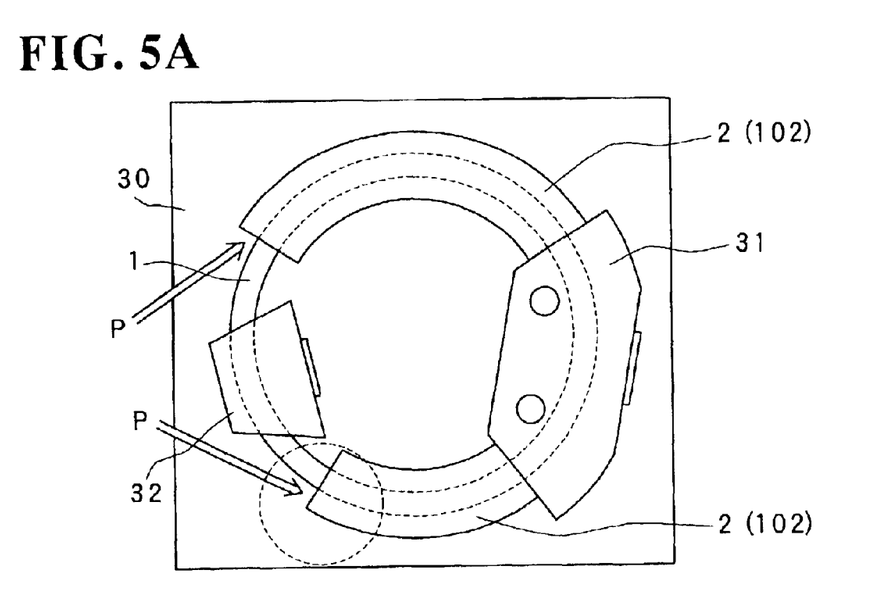
FIG. 5A is a plane view and FIG. 5B is an enlarged perspective view of the essential portions showing a central core injection jig used in a first embodiment of the production method of a steering wheel according to the present invention.
Figure 5B:
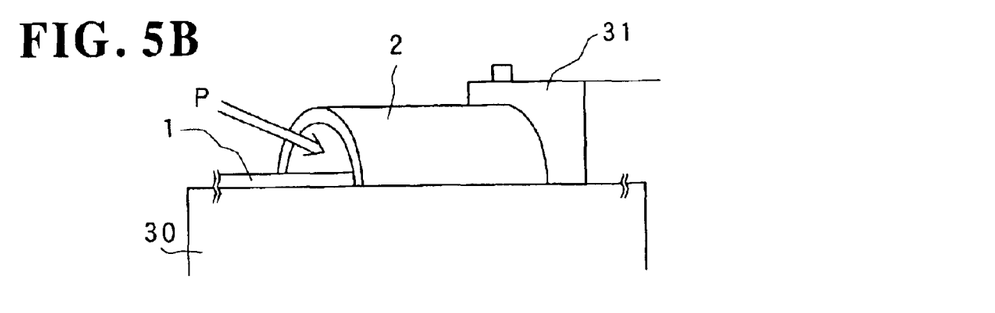

After forming the outer shell 2 by integrally welding the divided bodies 6 and 6 in this manner, as shown in FIG. 5, plastic P is filled between the outer shell 2 and the core metal 1 to form the central core 7 in the state in which the outer shell 2 and the core metal 1 are fixed on the central core injection jig 30. FIG. 5A is a plane view, while FIG. 5B is an enlarged perspective view of the essential portions.

The central core injection jig 30 of the present embodiment has a shape in which the outer shell 2 of the upper portion 102 of the steering wheel, the outer shell 2 of the lower portion 103, and the core metal 1 of the leather covered portions 101 are arranged at prescribed locations on the upper surface of a base, a groove (not shown) is formed having an inner surface shape that is the same as the shape of the outer surface of the bottom (or top) half, and is fixed in a state in which the core metal 1 is arranged at the center position in the outer shell 2 when the outer shell 2 and the core metal 1 passing through its inside are arranged in this groove. In addition, a sealing jig 31 is also provided in the base that seals one end of the outer shell 2 that composes the upper portion 102 of the steering wheel, and the other end of the outer shell 2 that composes the lower portion 103 in the state in which the outer shell 2 and the core metal 1 are fixed in the groove. In the present embodiment, the sealing jig 31 is also provided with a clamp for clamping the core metal 1 in the groove. In addition, reference symbol 32 shown in the drawing indicates the clamp of the core metal 1.

After fixing the outer shell 2 and the core metal 1 on this central core injection jig 30, and injecting plastic P from the end of the outer shell 2 that is not sealed into the space between the outer shell 2 and the core metal 1, plastic P is allowed to harden to form the central core 7.

After forming the central core 7 in this manner, the steering wheel is finished as necessary by coating or painting and so forth and leather is wrapped around the leather covered portions 101 to obtain the finished steering wheel.

The vibration means of the vibration welding apparatus 20 is equipped with electromagnets arranged on both sides (linear type) or in three directions (orbital type), and is composed so as to apply vibrations in the lengthwise direction of the upper part 11 to the upper part 11 of welding jig 10 by mutually synchronizing these electromagnets. In addition, the anchoring base 13 is able to be inched up and down, and is composed so as to be able to apply a prescribed welding pressure in a direction that presses the lower part 12 against the upper part 11.

According to the present embodiment, since joining of the divided bodies 6 and 6 is carried out by welding plastic layer 4 on the inner surface of surface material 3, a steering wheel can be produced by integrating the divided bodies 6 without using adhesive. Since plastic layers 4 and 4 are integrated by melting, adequate joining strength is obtained in the welding step alone. Thus, in addition to not requiring an annealing step as in the case of using an adhesive, since a step for removing adhesive burrs is also not required, the number of steps can be reduced thereby making it possible to shorten the amount of time required for production.

In addition, in the resulting steering wheel, since the divided bodies 6 and 6 are integrated into a single unit, even if expansion or contraction occurs in the central core 7 due to changes in the environmental temperature, the bending moment does not concentrate at the joined site, and the formation of cracks in the joined surfaces of the divided bodies 6 and 6 is prevented.

Figure 6:
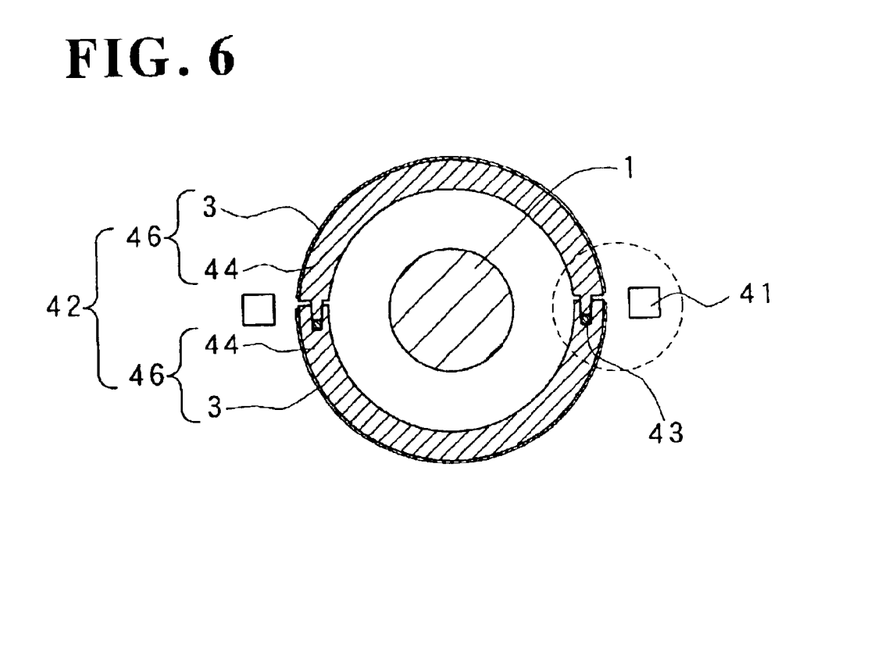
FIG. 6 is an explanatory drawing of the production process in a second embodiment of the production method of a steering wheel according to the present invention.
Figure 7:
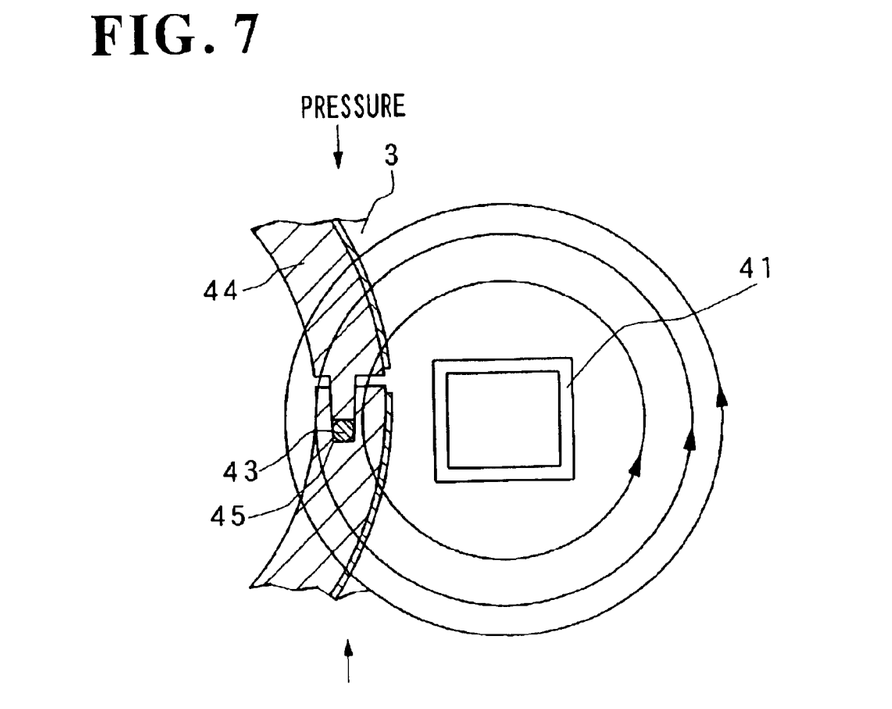
FIG. 7 is an enlarged view of the essential portion shown by enlarging the portion encircled with a broken line in FIG. 6.
Figure 8:
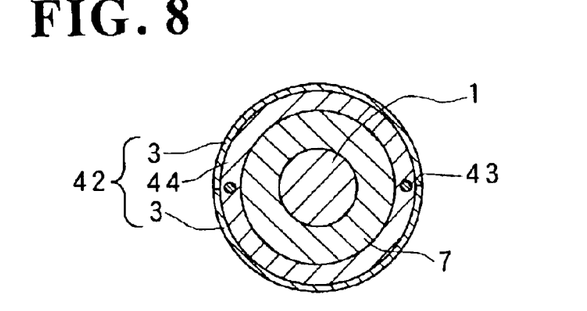
FIG. 8 is a cross-sectional view of a steering wheel in a second embodiment according to the present invention.

FIGS. 6 through 8 show a second embodiment of the present invention. FIG. 6 is an explanatory drawing of the process used to produce a steering wheel, FIG. 7 is an enlarged view of the essential portion shown by enlarging the portion encircled with a broken line in FIG. 6, and FIG. 8 is a cross-sectional view of the steering wheel obtained in the present embodiment. The main difference between the present embodiment and the previously mentioned first embodiment is that, instead of the previously mentioned vibration welding method, a high-frequency induction heating welding method is used to weld the plastic layers 44 and 44 of the divided bodies 46 and 46. The same reference symbols are used to indicate those constituent features that are identical to the constituent features of the above first embodiment, and their explanation is omitted.

In producing the steering wheel of the present embodiment, a plastic layer 44 is first formed by injection molding, foaming, transfer molding or compression molding of plastic on the inside of a pre-molded surface material 3 in the same manner as the above first embodiment to produce divided bodies 46 and 46. At this time, an engaging portion of a shape that mutually engages with plastic layer 44 of the other adjoining divided body 46 is provided on the joined end surface of the plastic layer 44. Although there are no particular restrictions on the shape of the engaging portion, in addition to forming a gap slightly larger than the gap between surface materials 3 and 3 of the steering wheel to be obtained between the joined end surfaces of surface materials 3 and 3 in the state in which divided bodies 46 and 46 are temporarily joined, a cavity 45 is formed inside the plastic layer 44 for containing a ferromagnetic body 43. The cavity 45 is formed into the shape of a groove that is continuous from one end to the other end of the divided body 46 in the lengthwise direction.

Next, the ferromagnetic body 43 is housed in the cavity 45 inside the plastic layer 44. The ferromagnetic body 43 is composed of, for example, a ferromagnetic material such as iron, and there are no particular restrictions on its shape or properties provided it is able to be arranged continuously along the lengthwise direction of the divided body 46 within the plastic layer 44 of the divided body 46. For example, a ferromagnetic material may be formed into the shape of a wire or a sheet, it does not have to be a solid, and, for example, may be a resin that contains a powder of a ferromagnetic material.

Next, as shown in FIG. 6, after engaging the divided body 46 serving as the top of the steering wheel and the divided body 46 serving as the bottom of the steering wheel and temporarily joining, they are integrated into a single unit by welding both the plastic layers 44. In the present embodiment, a magnetic field generator 41 comprised of a water-cooled coil is used for welding the plastic layers 44 and 44. This magnetic field generator 41 generates a magnetic field around a coil as shown by the arrows in FIG. 7 when a high-frequency current is applied to the coil.

More specifically, although the divided bodies 46 are first temporarily joined, at this time, the core metal 1 that pre-forms the leather covering base material (not shown) is held between the divided bodies 46 and 46 using a core metal clamping jig (not shown).

The magnetic field generator 41 is then arranged in the vicinity of the joined surfaces of the divided bodies 46 and 46, namely in the vicinity of the ferromagnetic body 43 contained inside the plastic layer 44, and high-frequency current is applied to the magnetic field generator 41 while applying pressure in the direction in which the divided bodies 46 and 46 are mutually pressed together. The ferromagnetic body 43 is excited and eddy current is generated due to the magnetic field generated by the magnetic field generator 41. The ferromagnetic body 43 is generates heat due this generated eddy current, and as a result, the plastic layers 44 melt in the vicinity of the engaging portion and as a result of the following cooling, the plastic layers 44 and 44 are integrally welded.

Welding conditions are set so that plastic layers 44 and 44 are mutually integrally welded at the joined surfaces of the divided bodies 46 and 46 after welding, there is no mutual contact between corresponding surface materials 3 and 3, and the corresponding end surfaces of surface materials 3 and 3 are opposed while having a slight gap in between.

In addition, in the present embodiment, since a gap is formed between the corresponding end surfaces of surface materials 3 and 3 in the state in which the divided bodies 46 and 46 are temporarily joined, and pressure is applied to the divided bodies 46 and 46 in the direction in which they are mutually pushed together during high-frequency induction heating welding, deformation occurs in the vicinity of the joined end surfaces of melted or softened plastic layers 44 and 44, causing the gap between surface materials 3 and 3 to gradually decrease. Thus, high-frequency induction heating welding should be stopped prior to mutual contact between corresponding the end surfaces of surface materials 3 and 3 by adjusting the welding conditions.

More specifically, the pressure applied to the divided bodies 46 and 46 during high-frequency induction heating welding is preferably set within the range of 0.1–10 bar, the frequency of the high-frequency current applied to the coil is preferably set within the range of 100 kHz to 15 MHz, and the time current is applied is preferably set within the range of about 1–60 seconds.

In this manner, after the outer shell 42 is formed by integrally welding the divided bodies 46 and 46, plastic is filled between the outer shell 42 and the core metal 1 to form the central core 7 in the same manner as the above first embodiment.

After forming the central core 7, the steering wheel is finished as necessary by coating or painting and so forth and leather is wrapped around the leather covered portions 101 to obtain the finished steering wheel.

In the upper portion 102 and the lower portion 103 of the steering wheel obtained according to the present embodiment, as shown in FIG. 8, the plastic layers 44 and 44 and the central core 7, integrated into a single unit on the inner surface of the surface materials 3 and 3 divided into two parts, are sequentially formed, and the core metal 1 is arranged in the center. In addition, the ferromagnetic body 43 is embedded within the plastic layer 44 in the vicinity of the joined surfaces of the surface materials 3 and 3.

In the present embodiment as well, since joining of the divided bodies 46 and 46 is carried out by welding of the plastic layers 44 and 44 on the inner surface of surface materials 3 and 3, a steering wheel can be produced by integrating the divided bodies 46 and 46 into a single unit without using adhesive. Thus, similar to the above first embodiment, effects are obtained consisting of being able to reduce the number of steps, shortening the amount of time required for production and preventing the formation of cracks.

Moreover, ultrasonic welding can also be used instead of the vibration welding or high-frequency welding in the above embodiments.

In this case, the divided body 6 serving as the top of the steering wheel and the divided body 6 serving as the bottom of the steering wheel are installed on a jig horn of an ultrasonic apparatus in a state in which they are butt joined, the divided bodies 6 and 6 are resonated by applying ultrasonic waves, and heat is generated by collision between one divided body 6 with the other divided body 6 resulting in melting and welding of both.

Furthermore, although the example of a method for producing a steering wheel has been explained in each of the above embodiments, the production method of the present invention can be similarly applied to various shapes other than a steering wheel provided that it is a composite molded article that can be molded by combining a plurality of divided bodies having a surface material and a plastic layer provided on the inside of the surface material, and the divided bodies can be integrated into a single unit without using adhesive by integrally welding the plastic layers. The present invention can also be applied to composite molded articles having a structure in which there is no core metal and/or central core.

Although the following provides an explanation of the present invention by indicating its specific embodiments, the present invention is not limited to these examples.

EXAMPLE 1

A steering wheel was produced according to a production method using vibration welding as shown in FIGS. 3 through 5.

To begin with, the divided body 6 to serve as the top of the steering wheel and the divided body 6 to serve as the bottom of the steering wheel were produced in the manner described below. Namely, a decorative veneer having a thickness of 0.65 mm was provided for use as the wood surface material 3, and pre-molding was carried out by curving with a thermo-compression press. Next, the pre-molded surface material 3 was arranged in a molding mold, and PPS plastic was injection molded inside to integrally form the plastic layer 4 and the reinforcing rib 5 and obtain the divided body 6. The thickness of the plastic layer 4 was 3.0 mm, and the thickness of the reinforcing rib 5 was 1.5 mm. In addition, the joined end surface of divided body 6 to serve as the top of the steering wheel had a shape such that the end surface of the plastic layer 4 protruded about 0.05 mm more than the end surface of the surface material 3, and the end surface of the plastic layer 4 had a projection 4a having a width of 1.5 mm and height of 1.0 mm on the end surface thereof. On the other hand, the joined end surface of divided body 6 to serve as the bottom of the steering wheel had a shape such that the end surface of plastic layer 4 protruded about 0.05 mm more than the end surface of surface material 3, and the end surface of plastic layer 4 had a groove 4b having a width of 2.5 mm and depth of 0.5 mm in the end surface of plastic layer 4.

On the other hand, a core metal 1 in which the rim was composed of a metal rod was provided to form a leather covering base material.

Next, as shown in FIGS. 3 and 4, the divided body 6 to serve as the top of the steering wheel and the divided body 6 to serve as the bottom of the steering wheel were installed in the upper vibrating jig 11 and the lower pressing jig 12, respectively, of the welding jig 10 of the vibration welding apparatus 20. At this time, the core metal 1 was clamped in the core metal clamping jig 14, and the core metal 1 was held in a suspended state between the divided bodies 6 and 6.

The low divided body 6 was then pressed in the direction in which it is pressed against the upper divided body 6 by raising the anchoring base 13 while applying vibrations in the direction of the above vibrations (indicated with arrows in the drawings) to the upper part 11 of the vibration welding apparatus 20. The conditions of vibration welding consisted of vibration frequency of 240 Hz, amplitude of 1.5 mm, welding pressure of 300 kgf, and oscillation time of 5 seconds.

As a result of this vibration welding, the vicinity of the engaging portions 4a and 4b of the plastic layers 4 and 4 was integrally welded and the divided bodies 6 and 6 were securely joined resulting in the formation of the outer shell 2. In the resulting the outer shell 2, a gap of about 0.05 mm was formed between the corresponding joined end surfaces of surface materials 3 and 3 of the divided bodies 6 and 6. In addition, there was no deformation of the divided bodies 6 and 6 observed that was caused by vibration welding.

Continuing, the outer shell 2 and the core metal 1 were placed in the central core injection jig 30 as shown in FIG. 5, and urethane foam plastic was filled between the outer shell 2 and the core metal 1 followed by foaming of this plastic to form the central core 7.

Subsequently, finishing such as painting or coating was performed as necessary, and leather was wrapped around the leather covered portions 101 to obtain a steering wheel.

EXAMPLE 2

A steering wheel was produced according to a production method using high-frequency induction heating welding as shown in FIGS. 6 through 8.

To begin with, the pre-molded wood surface material 3 was arranged in the molding mold in the same manner as the above Example 1, and PPS plastic was injection molded inside to form the plastic layer 44 and obtain the divided body 46. The thickness of the plastic layer 44 was 3.0 mm. In addition, the joined end surface of the lower divided body 46 had a shape such that the plastic layer 44 protruded 0.05 mm more than the surface material 3, and had a groove having a width of 1.0 mm and depth of 2.0 mm. On the other hand, the joined end surface of the upper divided body 46 had a shape such that the plastic layer 44 protruded 0.05 mm more than the surface material 3, and had a projection having a width of 0.95 mm and height of 2.0 mm.

On the other hand, the core metal 1 was provided in the same manner as Example 1.

Next, after containing the ferromagnetic body 43 in the form of an iron wire having a diameter of 0.8 mm in the cavity 45 of the divided body 46 to serve as the bottom of the steering wheel, the divided body 46 to serve as the top of the steering wheel was temporarily joined with the bottom divided body 46. At this time, the core metal 1 was clamped in the core metal clamping jig and held in a suspended state between the divided bodies 46 and 46.

The magnetic field generator 41 was arranged near the vicinity of the joined surfaces of the divided bodies 46 and 46 and a high-frequency current was applied to magnetic field generator 41 while applying pressure in the direction in which the divided bodies 46 and 46 are mutually pressed together. The pressure applied to press the divided bodies 46 and 46 together during high-frequency induction heating welding was 4 bar, the frequency of the high-frequency current applied to the coil was 8 MHz, and the time during which the current was applied was 15 seconds.

As a result of this high-frequency induction heating welding, the vicinity of the joined end surfaces of the plastic layers 44 and 44 were integrally welded and the divided bodies 46 and 46 were securely joined to form the outer shell 42. In the resulting the outer shell 42, a gap of about 0.05 mm was formed between the corresponding joined end surfaces of surface materials 3 and 3 of the divided bodies 46 and 46.

Continuing, after filling urethane foam plastic between the outer shell 42 and the core metal 1 in the same manner as Example 1, the plastic was foamed to form the central core 7.

Subsequently, finishing such as painting or coating was performed as necessary, and leather was wrapped around the leather covered portions 101 to obtain a steering wheel.

What is claimed is:

1. A composite molded article comprising a plurality of divided bodies, each comprising a plastic layer integrally welded on the inside of a surface material, an engaging portion formed on each end surface of the divided bodies, said engaging portions engaged with each other.

2. A production method of a composite molded article comprising the steps of:
   providing a plurality of divided bodies, each of which comprises a surface material and a plastic layer provided on the inside of said surface material, and an engaging portion formed on each end surface of the divided bodies;
   engaging said engaging portions with each other; and
   integrally welding the plastic layers of said a plurality of divided bodies.

3. A production method of a composite molded article according to claim 2, wherein said plastic layers of said divided bodies are integrally welded by vibration welding, ultrasonic welding or high-frequency welding.

4. A steering wheel comprising:
   a core metal;
   a central core provided around the periphery of at least a portion of said core metal, and
   an outer shell provided around the periphery of said central core;
   wherein said outer shell comprises a plurality of divided bodies, each of which comprises a surface material and a plastic layer provided on the inside of said surface material, and the plastic layers of said plurality of said divided bodies are mutually integrally welded.

5. A production method of a steering wheel comprising the steps of:
   a) providing a plurality of divided bodies, each of which comprises a surface material and a plastic layer provided on the inside of said surface material;
   b) forming an outer shell by integrally welding said plastic layers of said divided bodies;
   c) providing a core metal to be arranged in said outer shell; and
   d) filling plastic between said outer shell and said core metal.

6. The production method of a steering wheel according to claim 5, wherein said plastic layers of said divided bodies are integrally welded by vibration welding, ultrasonic welding or high-frequency welding.

* * * * *